United States Patent [19]

Kashida et al.

[11] Patent Number: 4,875,222
[45] Date of Patent: Oct. 17, 1989

[54] INFORMATION SIGNAL TRANSMISSION SYSTEM BY PREDICTIVE DIFFERENTIAL CODING

[75] Inventors: Motokazu Kashida, Tokyo; Toshiyuki Masui, Kanagawa, both of Japan

[73] Assignee: Canon Kabushiki Kaisha, Tokyo, Japan

[21] Appl. No.: 919,545

[22] Filed: Oct. 15, 1986

Related U.S. Application Data

[63] Continuation of Ser. No. 745,307, Jun. 14, 1985, abandoned.

[30] Foreign Application Priority Data

Jun. 28, 1984 [JP] Japan .................. 59-133909
Jun. 28, 1984 [JP] Japan .................. 59-133910

[51] Int. Cl.$^4$ .......................................... H04B 14/06
[52] U.S. Cl. ........................................ 375/26; 375/27; 332/11 D
[58] Field of Search ............................ 375/25–27,122; 332/11 D; 358/133,135,136

[56] References Cited

U.S. PATENT DOCUMENTS

| | | | |
|---|---|---|---|
| 2,516,587 | 7/1950 | Peterson | 375/26 |
| 4,385,393 | 5/1983 | Chaure et al. | 375/26 |
| 4,513,426 | 4/1985 | Jayant | 375/27 |
| 4,519,085 | 5/1985 | Catros | 332/11 D |
| 4,573,167 | 2/1986 | Hentschke et al. | 375/27 |
| 4,639,778 | 1/1987 | Yamaguchi et al. | 375/27 |
| 4,689,671 | 8/1987 | Ohki et al. | 375/27 |

Primary Examiner—Robert L. Griffin
Assistant Examiner—Marianne Huseman
Attorney, Agent, or Firm—Robin, Blecker, Daley & Driscoll

[57] ABSTRACT

An information signal transmission system for transmitting a code sequence in which mutually adjoining codes are correlated with each other. The information signal transmission system is arranged to compute a predictive code for each code sequence by using "n" number ($n \geq 2$) of codes included in the same code sequence; to compute a difference code relative to a difference between the predictive code and the code corresponding to the predictive code. The system to thus obtains a group of difference codes corresponding to "m" number ($m \geq n$) of consecutive codes included in the code sequence and transmits codes by adding the predictive code corresponding to one of the "m" number of the consecutive code to the difference code group.

20 Claims, 3 Drawing Sheets

INFORMATION SIGNAL TRANSMISSION SYSTEM BY PREDICTIVE DIFFERENTIAL CODING

This is a continuation of application Ser. No. 745,307, filed June 14, 1985, now abandoned.

BACKGROUND OF THE INVENTION:

1. Field of the Invention:

This invention relates to an information signal transmission system and more particularly to an information signal transmission system for transmitting a code sequence by predictive differential coding in which, mutually adjoining codes are correlated to each other.

2. Description of the Prior Art:

Generally, a digital signal obtained by sampling and then quantizing an analog signal such as an audio signal, or a video signal having a time-wise correlation, and by further subjecting them to analog-to-digital conversion, that is, a code sequence consisting of, for example, pulse-code-modulated (PCM) code has the mutually adjoining codes thereof correlated to each other. Heretofore, in transmitting the code sequence of this kind of a transmission system and recording or reproducing it on or from a record bearing medium, a code frame has been formed with at least one code group consisting of a plurality of information codes, a synchronizing codes and an error detecting-correcting code and the transmission has been carried out frame by frame.

FIG. 1 of the accompanying drawings shows an example of the conventional code frame to be transmitted as mentioned above. Referring to FIG. 1, a leading code 1 is a synchronizing code. A reference numeral 2 denotes information code and a numeral 3 an error detecting-correcting code. The synchronizing code 1 and the error detecting-correcting code 3 represent redundant code required for transmission of digital data. For example, with the number of bits of the error detecting-correcting code 3 increased, an error detecting and correcting capability of a code receiving arrangement can be enhanced against an error occurring in the transmission line.

However, the redundant code or the increase in the number of bits thereof, results in the increase of transmission signal frequency in the transmission of codes and that of the transmission band. Then, the transmission tends to be affected by the frequency characteristic of the transmission line and external noises. This eventually causes an increase in transmission errors. Further, in the case of recording or reproduction on or from a record bearing medium such as a magnetic tape, the arrangement eventually shortens the recording wavelength. Then, the transmission would be readily affected by the frequency characteristic of the record bearing medium, dust, scars, signal drop-outs, etc. Further, in cases where the number of quantization bits of each information code is increased for improved quality of a received or reproduced analog signal, this likewise results in an increase in the transmission frequency and in shorter recording wave length. Then, that arrangement also presents the same problem.

To moderate the increase in the rate of such code, there has been employed a high efficiency encoding technique, which includes varied methods. Of these methods, it has been most popular to effect code conversion by a differential PCM (hereinafter will be called DPCM) method. In the DPCM method, a next digital code is predicted from a past information code and only a difference between a predicted valve and a current code (predicted error) is quantized by a certain quantization step. Compared with the above-stated ordinary information signal transmission arrangement, the code transmission method which performs the code conversion by the DPCM method permits reduction in the number of bits required for transmission in cases where signals of the same quality are to be transmitted.

Further, code conversion by an adaptive differential PCM (hereinafter will be called ADPCM) method has recently been proposed for further reduction in the code rate. The ADPCM method moreover permits the quantization step to be variable. According to this method, the quantization step width $\Delta$ is determined as a functional value of the past codes. With this functional value suitably selected, code transmission can be more efficiently carried out than by the DPCM.

However, in transmitting codes in accordance with such a high efficiency encoding technique, the predicted value must be restored from the past code at the time of decoding. Generally, for the prediction, one code of the past becomes the predicted value, as in the case of a one-dimensional pre-value prediction method, or a plurality of past codes as in the case of a linear prediction method are used. In either of these methods, once an error arises in a transmission line, a next code decoded with a predicted value which is restored by using this erroneous code also becomes erroneous. Then at the decoding process, the error endlessly propagates. Further, with the above-stated ADPCM method employed, the quantization step width $\Delta$, which is obtained as the functional value of the past codes must be also restored at the time of decoding. Accordingly, in the event of occurrence of an error in the transmission line, a next code which is decoded by the erroneous quantization step width also becomes erroneous and thus the error also endlessly propagates.

SUMMARY OF THE INVENTION

In view of the above-stated problems of the prior art, it is an object of this invention to provide an information signal transmission system which is capable of solving all the problems mentioned in the foregoing.

It is another object of this invention to provide an information transmission system wherein, in transmitting information signals by a high efficiency coding technique, even in the event of the occurrence of an error in the transmission line, a code error during the process of decoding can be prevented from propagating over a long period of time.

To attain these objects, a preferred embodiment of this invention comprises, in an information signal transmission system for transmitting a code sequence in which mutually adjoining codes are correlated with each other: input means for inputting a code sequence according to sample values of the information signal; means for computing a predictive code for each of the codes of the code sequence by using at least one other code included in the same code sequence; means for computing a difference code relative to a difference between the predictive code and the code in the code sequence corresponding to the predictive code; means for adding the predictive code, which corresponds to one of a plurality of consecutive codes included in the code sequence, to a plurality of said difference codes corresponding to the plurality of consecutive codes, respectively, to form a code group; and transmission means for transmitting the code group.

These and further objects and features of the invention will become apparent from the following detailed description of preferred embodiments thereof taken in conjunction with the accompanying drawings.

DETAILED DESCRIPTION OF THE PREFERRED EMBODIMENTS

Figure 1:
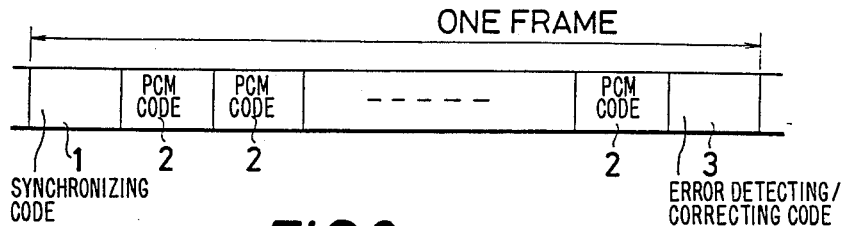
FIG. 1 shows an example of a conventional code frame arranged for code transmission.
Figure 2:
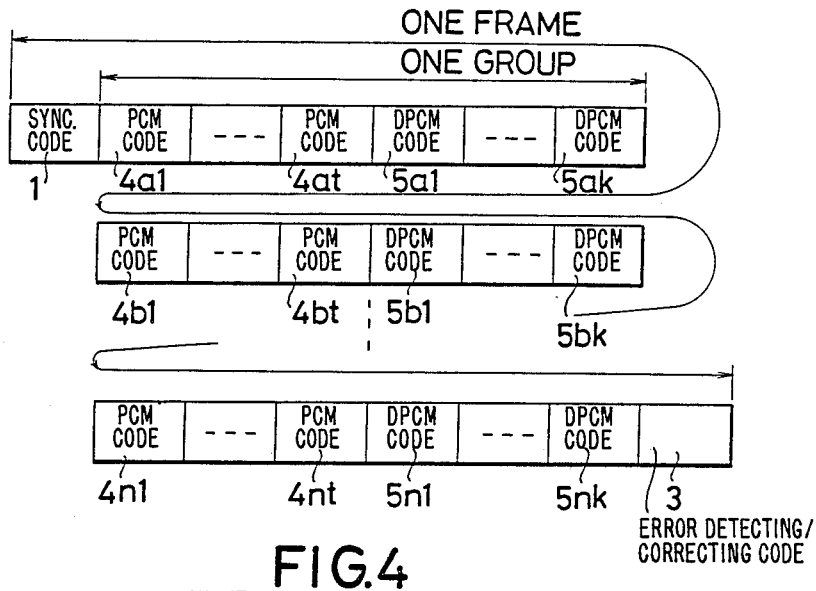
FIG. 2 shows the frame arrangement of transmission code according to this invention as an embodiment thereof.

Preferred embodiments of this invention are arranged as described below with reference to the accompanying drawings:

FIG. 2 shows by way of example the frame arrangement of codes to be transmitted according to this invention. In FIG. 2 reference symbols 5a*l* to 5a*k*, 5b*l* to 5b*k*, ---- and 5n*l* to 5n*k* denote DPCM codes respectively. One group is formed by a "k" number of DPCM codes. An "n" number (n being at least one) of the code group or groups are included in one frame. These code groups are respectively headed by a "t" number of past codes 4i*l* to 4i*t* (i=a, b, and n) in case that predictive values which are used for forming the leading DPCM code 5i*l* (i=a, b, ----and n) of the groups by means of a DPCM encoder are predicted by a predicting method such as a linear predicting method using the "t" number of the past code. In accordance with the arrangement described above, a predictive value is always determined separately for each of the groups. This arrangement limits propagation of an error to the inside of each group. Further, since it is mainly a prediction error that is to be transmitted, the transmission frequency remains low even in the event of increase in the number of the quantization bits of information code and in the number of bits of the redundant code. Therefore, code transmission can be accomplished in a higher degree of quality at the same transmission frequency.

Figure 3:
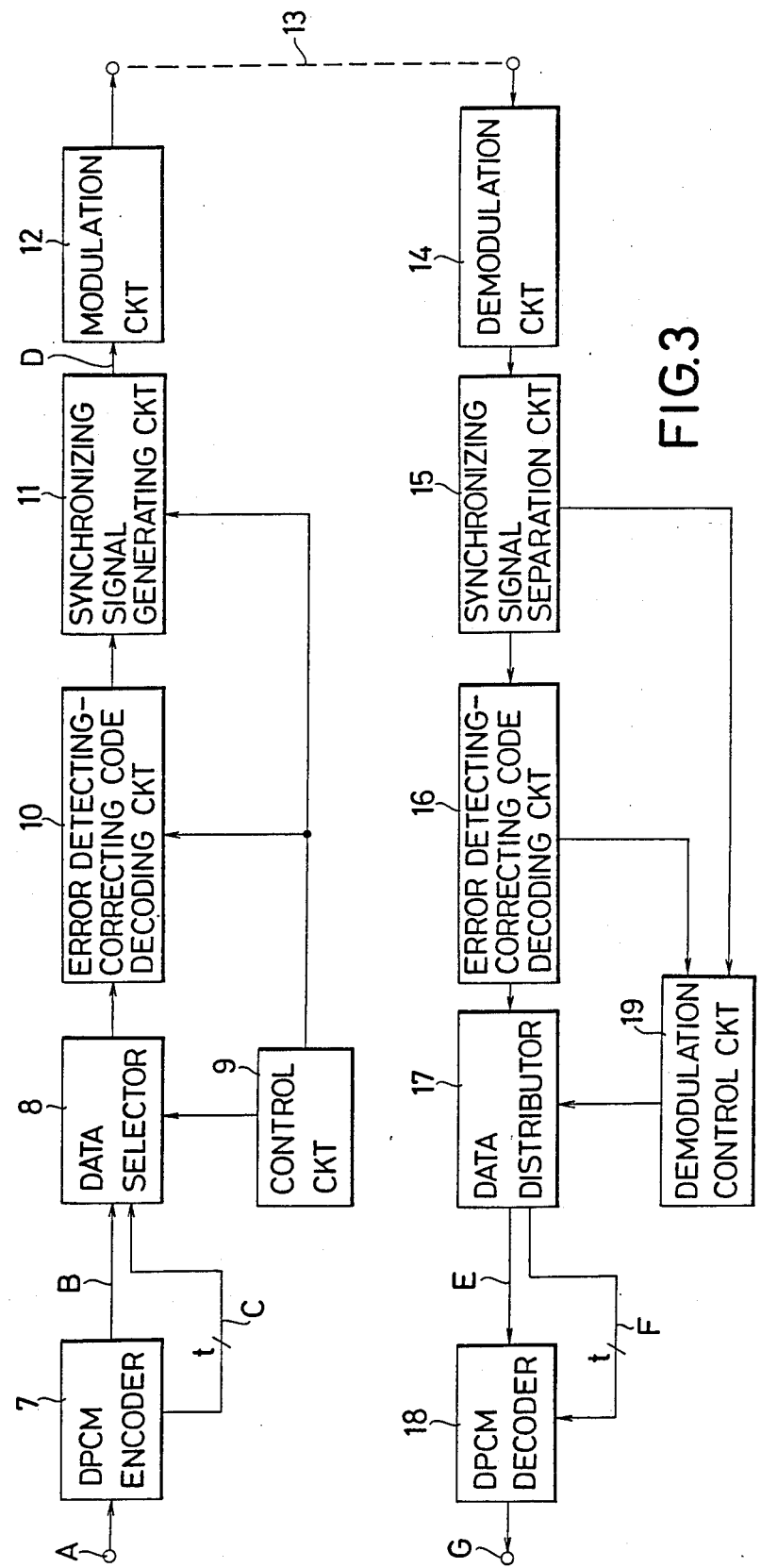
FIG. 3 is a block diagram showing an information signal transmission system to which the code transmitting method of this invention is applied as an embodiment thereof.

FIG. 3 shows an information signal transmission system to which this invention is applied as an embodiment thereof. A terminal A is arranged to receive a sequence of information code, each data correlating with preceding and ensuing code. These incoming codes are converted into DPCM codes B by means of a DPCM encoder 7 which constitutes predictive differential coding means. A code selector 8 receives, concurrently with the DPCM codes B, a "t" number of past codes C which have been used for the DPCM signal conversion. Then, either the codes B or the codes C are selectively produced by a control circuit 9. A reference numeral 10 denotes an error detecting-correcting code decoding circuit. A numeral 11 denotes a synchronizing signal generating circuit. The output D of the synchronizing signal generating circuit 11 becomes a code train which is an shown in FIG. 2. Selector 8 and circuits 9–11 together constitute code sequence forming means. A modulation circuit 12 is arranged to perform modulation suitable for the transmission medium, such as MFM (modified frequency modulation). The output of the modulation circuit 12 is supplied to a transmission line or to a record bearing medium 13 via a recording element. The signal which comes through the transmission line or the record bearing medium 13 is supplied via a reproducing element to a demodulation circuit 14 which is arranged to demodulate the signal modulated by the modulation circuit 12. After that, the demodulated signal is supplied to a synchronizing signal separation circuit 15 which is arranged to detect and separate a synchronizing signal for frame discrimination. Another error detecting-correcting code decoding circuit 16 is arranged to detect and correct and error in a predetermined manner. A code distributor 17 is arranged to separate the demodulated DPCM signal E and the "t" number of past codes F which have been used for DPCM encoding from each other and to supply them to a DPCM decoder 18. A demodulation control circuit 19 is arranged to control the above-stated code distributor 17 and the DPCM decoder 18. The decoded information signals are produced from an output terminal G.

With the information signal transmission system arranged as described above, the leading code of the code groups are arranged to be the "t" number of past codes obtained at the time of encoding while other codes are processed as DPCM codes. The system is thus arranged to mainly transmit a prediction error. Therefore, the system transmits codes at a low frequency. Thus, at the time transmission frequency, the embodiment permits addition of codes of a larger number of quantization bits and more redundant codes of error detecting-correcting codes, so that the codes can be transmitted in higher quality with improved error detecting and correcting capability. Further, since the "t" number of past codes obtained at the time of encoding are arranged to head the code groups respectively, even in the event of an error occurrence during a transmission process, the propagation of the error at the time of decoding remains within the applicable group. Therefore, even in the case of linear prediction, no error propagates over a prolonged period.

While an embodiment has been described above on the basis of the frame arrangement shown in FIG. 2, the continuation of an error of the decoded information signal of course can be prevented also by some different arrangement, such as applying an interleave arrangement to the past codes and the DPCM code within a frame or between frames or multiplexing error detecting-correcting codes.

Further, in accordance with this invention, any other predictive encoding method may be employed in place of the DPCM method described in the foregoing, to attain the same advantageous effect as long as a predictive value is obtained from past codes at the time of prediction.

The number of bits of the synchronizing signal within each frame and the position and the number of bits of the error detecting-correcting code are not limited so long as they are not deviating from the spirit of this invention. Further, the number of the past codes in the predictive value obtained at the time of encoding, the number of bits, location and number of the DPCM signal and the number of groups within one frame are likewise not limited.

In case that the "t" number is a large number, code groups may be transmitted by adding a predictive value used for the DPCM and one PCM code to each of the code groups.

Figure 4:
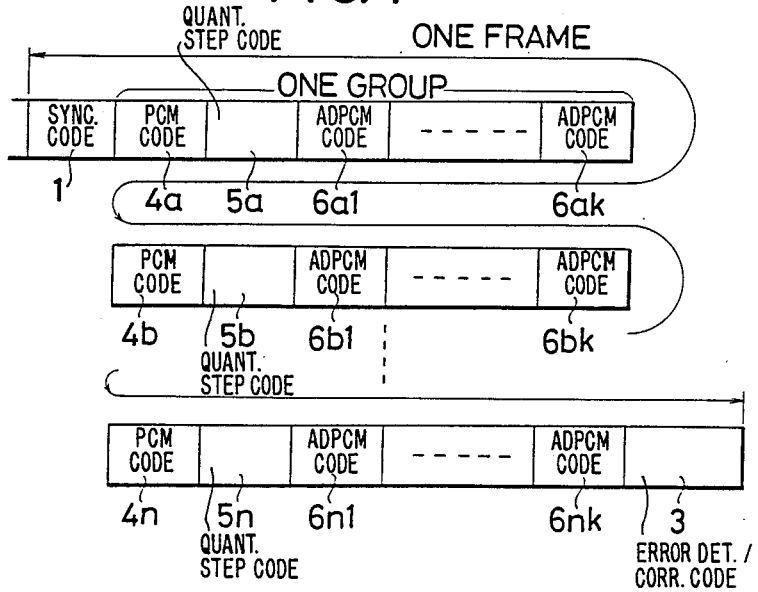
FIG. 4 shows the frame arrangement of transmission codes arranged according to this invention as another embodiment thereof.

FIG. 4 shows the frame arrangement of transmission codes arranged according to this invention as another embodiment thereof. Reference symbols 6al to 6ak, 6bl to 6bk, ---- and 6nl to 6nk denote ADPCM codes. One group is formed by a "k" number of ADPCM codes. An "n" number (n is at least 1) of the code group or groups are included in one frame. Each group is headed by a code $4i$ (i=a, b, ----and n) which is a predictive value (for example, a past code) used in obtaining a leading ADPCM code $6il$ (i=a,b, ----and n) of the group by means of an ADPCM encoder. Likewise, codes $5i$ (i=a, b, ---- and n) represent quantization step widths Δ used by the ADPCM encoder. In accordance with other predicting methods, the slots increases in the event of a plurality of parameters necessary for decoding. In the case of the arrangement described, the predictive value and the parameter required at the time of encoding are present for each group. Therefore, error propagation remains within each of the groups. Further, since the embodiment is arranged to mainly transmit the prediction error alone, the transmission frequency remains low even in cases where the number of quantization bits of the information code and the number of bits of the redundant code increase, so that the codes can be transmitted in a higher degree of quality at the same transmission frequency.

Figure 5:
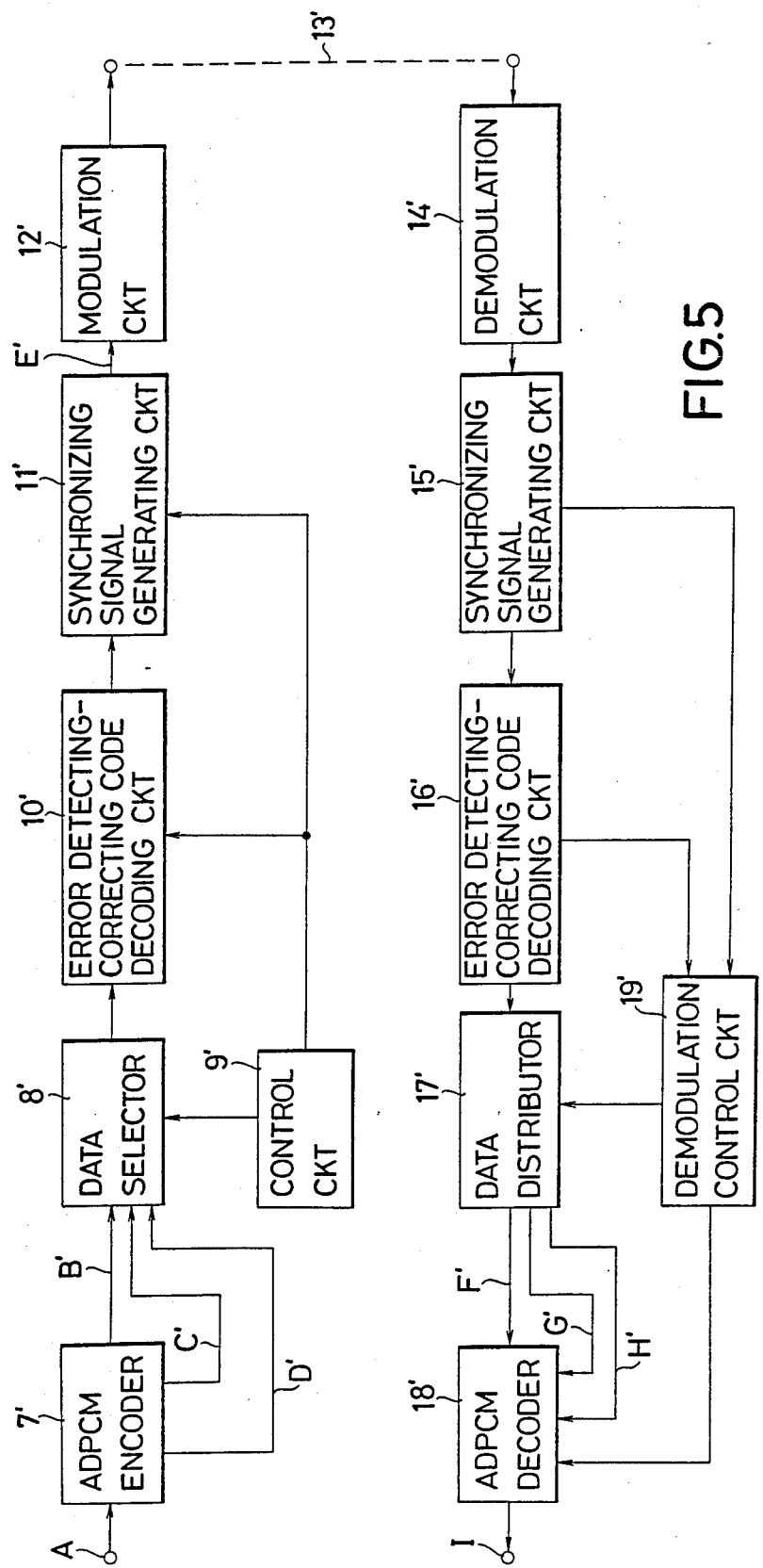
FIG. 5 is a block diagram showing a code transmission system to which the data transmitting method of this invention is applied as another embodiment.

FIG. 5 shows a an information signal transmission system to which the code transmission arrangement of the subject invention is applied. A terminal A is arranged to receive a sequence of information code, each data correlating with preceding and ensuing codes. These incoming codes are converted into ADPCM codes B' by means of an ADPCM encoder 7'. A code selector 8 is arranged to receive, concurrently with the ADPCM codes B', a predictive value C' and parameter code D' such as a quantization step width value, etc., which have been used for conversion into the ADPCM signal. Then, one of the codes B', C' and D' is selectively produced by means of a control circuit 9'. A reference numeral 10' denotes an error detecting-correcting code decoding circuit. A numeral 11' denotes a synchronizing signal generating circuit. The output E' of the synchronizing signal generating circuit 11' becomes a code train which is as shown in FIG. 4. A modulation circuit 12 is arranged to perform modulation in a manner suitable for the transmission medium, such as MFM (modified frequency modulation). The output of the modulation circuit 12' is supplied to a transmission line or a record bearing medium 13' via a recording element. Then, the signal which comes through the transmission line or the record bearing medium 13' is supplied via a reproducing element to a demodulation circuit 14' which is arranged to demodulate the signal modulated by the modulation circuit 12'. The demodulated signal thus obtained is then supplied to a synchronizing signal separation circuit 15' to have a synchronizing signal for frame discrimination detected and separated by this circuit 15'. Another error detecting-correcting code decoding circuit 16' is arranged to detect and correct an error in a predetermined manner. A code distributor 17' is arranged to have the demodulated ADPCM signal F' and the predictive value G and the conversion parameter H' which have been used for the ADPCM encoding process separated from each other and supplied to an ADPCM decoder 18'. A demodulation control circuit 19' is arranged to control the above-stated code distributor 17' and the ADPCM decoder 18'. The decoded information signals are then produced from an output terminal I.

With the predictive value and the conversion coefficient added to each of the code groups as described in the foregoing, the information signal transmission system mainly transmits the prediction error. Therefore, the transmission frequency becomes low. This permits addition of a code of a larger number of quantization bits and more redundant codes such as error detecting-correcting codes at the same transmission frequency to ensure higher quality of transmission codes. The error detecting and correcting capability of the system can be thus improved. Further, since the code groups are respectively headed by the "t" number of past codes used for encoding, in the event of occurrence of an error during the process of transmission, the propagation of the error is limited to the inside of the code group. Therefore, no error propagation takes place over a prolonged period of time even in the case of linear prediction. This is an advantageous feature of the embodiment.

While the embodiment has been described above on the basis of the frame arrangement shown in FIG. 4, the continuation of an error of the decoded signals of course can be prevented also by some different arrangement, such as applying an interleave arrangement to the predictive value, the parameter and the ADPCM code within a frame or between the frames or multiplexing the error detecting and correcting codes.

Further, in accordance with this invention, any other adaptive prediction encoding method may be employed in place of the ADPCM method described above to attain the same advantageous effect as long as a parameter obtained from the past code is used for the prediction. In the case of an ADM (adaptive delta modulation) method, for example, an amplitude value Δ is arranged to be adaptively changed by multiplying it either "a" time or 1/a times. In the ADM method, a next value Δ is generally determined according to the condition of the past three codes. In case that this invention is applied to the ADM method, therefore, the value Δ and the condition of past three codes are added besides a predictive value to the front of the code group.

Further, the number of bits of the synchronizing signal within each frame shown in FIG. 4 and the position and the number of bits of the error detecting and correcting code are not limited so long as they are not deviating from the spirit of this invention. Further, the predictive value obtained at the time of encoding, the number of bits, location and number of the ADPCM signals and the number of groups within one frame are likewise not limited.

What is claimed is:
1. An information signal transmission system by predictive differential coding, comprising:
   (a) predictive differential coding means arranged to receive information codes according to digital values of the information signal, and arranged to produce difference codes according to differential values between the information codes and predictive codes for the information codes, said predictive differential coding means producing each of the difference codes by using a "k" number, where ($k \geq 2$), of the information codes;
(b) code sequence forming means for forming a code sequence which includes a plurality of code groups each of which includes an "m" number, where ($m \geq k$), of the difference codes and the "k" number of the information codes used for producing one of the "m" number of the difference codes; and
(c) transmission means for transmitting said code sequence.

2. A system according to claim 1, wherein said code sequence comprises a plurality of code frames each of which includes a plurality of said code groups.

3. A system according to claim 2, wherein each of said code frames further includes redundant codes.

4. A system according to claim 3, wherein said redundant codes include an error detecting code for codes included in said code frames.

5. A system according to claim 2, wherein each of said code frames further includes a synchronizing code.

6. An information signal transmission system by predictive differential coding, comprising:
(a) predictive differential coding means arranged to receive information codes according to digital values of the information signal, and arranged to produce difference codes according to differential values between the information codes and predictive codes for the information codes;
(b) code sequence forming means for forming a code sequence which includes a plurality of code groups each of which includes a "k" number, where ($k \geq 2$), of the information codes in succession and an "m" number, where ($m \geq k$), of difference codes; and
(c) transmission means for transmitting said code sequence.

7. A system according to claim 6, wherein said code sequence comprises a plurality of code frames each of which includes a plurality of said code groups.

8. A system according to claim 7, wherein each of said code frames further includes redundant codes.

9. A system according to claim 8, wherein said redundant codes include an error detecting code for codes included in said code frames.

10. A system according to claim 6, wherein each of said code frames further includes a synchronizing code.

11. An information signal transmission system by predictive differential coding, comprising:
(a) predictive differential coding means arranged to receive information codes according to digital values of the information signal, and arranged to produce difference codes according to differential values between the information codes and predictive codes for the information codes;
(b) code sequence forming means for forming a code sequence which consists of a plurality of code frames each of which includes a synchronizing code at the frame start, a "k" number, where ($k \geq 2$), of difference codes; and
(c) transmission means for transmitting said code sequence.

12. A system according to claim 11, wherein each of said code frames includes a plurality of code groups each of which includes at least one of the information codes and a plurality of the difference codes.

13. A system according to claim 11, wherein each of said code frames further includes at the end thereof an error detecting code for codes included in the code frame.

14. An information signal transmission system by predictive differential coding, comprising:
(a) predictive differential coding means arranged to receive information codes according to digital values of the information signal, and arranged to produce difference codes according to differential values between the information codes and predictive codes for the information codes;
(b) code sequence forming means for forming a code sequence which comprises a plurality of code frames each of which includes a synchronizing code at the frame start and a plurality of code groups, each of said code groups comprising at least one of the information codes and plurality of the difference codes; and
(c) transmission means for transmitting said code sequence.

15. A system according to claim 14, wherein each of said code frames further includes at its end an error detecting code for codes included in the code frame.

16. An information signal transmission system by predictive differential coding, comprising:
(a) predictive differential coding means arranged to receive information codes according to digital values of the information signal, and arranged to produce difference codes by quantizing differential values between the information codes and predictive codes for the information codes with a selected quantization step;
(b) code sequence forming means for forming a code sequence which includes a plurality of code groups each of which includes a plurality of the difference codes, at least one of the information codes, and a step code indicative of the selected quantization step; and
(c) transmission means for transmitting said code sequence.

17. A system according to claim 16, wherein said code sequence comprises a plurality of code frames each of which includes a plurality of said code groups.

18. A system according to claim 17, wherein each of said code frames further includes redundant codes.

19. A system according to claim 18, wherein said redundant codes include an error detecting code for codes included in said code frame.

20. A system according to claim 17, wherein each of said code frames includes a synchronizing code.

* * * * *

UNITED STATES PATENT AND TRADEMARK OFFICE
CERTIFICATE OF CORRECTION

PATENT NO.  : 4,875,222
DATED       : October 17, 1989
INVENTOR(S) : Motokazu Kashida It is certified that error appears in the above-identified patent and that said Letters Patent is hereby corrected as shown below:

```
Col. 1, line 28, change "codes" second occurrence to -- code --
Col. 1, line 63, change "code" to -- codes --
Col. 2, line  2, change "valve" to -- value --
Col. 5, line 20, change "increases" to -- increase --
Col. 5, line 33, delete "a"
Col. 4, line  2, change "an" to -- as --
```

Signed and Sealed this

Thirtieth Day of October, 1990

Attest:

HARRY F. MANBECK, JR.

*Attesting Officer*   *Commissioner of Patents and Trademarks*